(12) United States Patent
Shamir

(10) Patent No.: US 8,365,310 B2
(45) Date of Patent: Jan. 29, 2013

(54) METHOD AND APPARATUS FOR PROTECTING RFID TAGS FROM POWER ANALYSIS

(75) Inventor: Adi Shamir, Rehovot (IL)

(73) Assignee: Yeda Research & Development Co. Ltd., Rehovot (IL)

( * ) Notice: Subject to any disclaimer, the term of this patent is extended or adjusted under 35 U.S.C. 154(b) by 1044 days.

(21) Appl. No.: 12/374,745

(22) PCT Filed: Jul. 30, 2007

(86) PCT No.: PCT/US2007/074716
§ 371 (c)(1),
(2), (4) Date: Jan. 22, 2009

(87) PCT Pub. No.: WO2008/019246
PCT Pub. Date: Feb. 14, 2008

(65) Prior Publication Data
US 2010/0005533 A1    Jan. 7, 2010

Related U.S. Application Data

(60) Provisional application No. 60/821,515, filed on Aug. 4, 2006.

(51) Int. Cl.
*G06F 1/26*    (2006.01)
*G06F 11/00*    (2006.01)
*G08B 13/00*    (2006.01)
*G08B 21/00*    (2006.01)
*G08B 29/00*    (2006.01)

(52) U.S. Cl. .......................................... 726/36; 380/277

(58) Field of Classification Search .................. 340/572; 380/29
See application file for complete search history.

(56) References Cited

U.S. PATENT DOCUMENTS

| | | | |
|---|---|---|---|
| 6,294,997 B1 * | 9/2001 | Paratore et al. | 340/572.1 |
| 6,507,913 B1 | 1/2003 | Shamir | |
| 6,812,841 B2 * | 11/2004 | Heinrich et al. | 340/572.1 |
| 7,039,359 B2 * | 5/2006 | Martinez | 455/41.2 |
| 2004/0025032 A1 | 2/2004 | Chow et al. | |
| 2004/0158728 A1 | 8/2004 | Kim | |
| 2004/0222878 A1 | 11/2004 | Juels | |
| 2005/0271202 A1 | 12/2005 | Shu et al. | |
| 2006/0033608 A1 | 2/2006 | Juels et al. | |

OTHER PUBLICATIONS

Timo Kasper, David Oswald, and Christof Paar; Side-Channel Analysis of Cryptographic RFIDs with Analog Demodulation; 2001; rfid.cusp.org; pp. 1-15.*
Written Opinion of the International Searching Authority mailed Mar. 3, 2008 for PCT/US07/74716 filed Jul. 30, 2007.
International Preliminary Report on Patentability published Feb. 10, 2009 for PCT/US07/74716 filed Jul. 30, 2007.
International Search Report; Published May 8, 2008 for PCT/US2007/074716, filed Jul. 30, 2007.

* cited by examiner

*Primary Examiner* — Philip Chea
*Assistant Examiner* — Monjour Rahim
(74) *Attorney, Agent, or Firm* — Martin Fleit; Paul D. Bianco; Fleit Gibbons Gutman Bongini & Bianco PL

(57) ABSTRACT

Method and apparatus for protecting RFID tags against power attacks by embedding two capacitors in an RFID tag and coupling to the RFID power extraction and computational circuitry to be operated so that at any given time during normal operation of the RFID tag one of them is coupled to the power extraction circuitry of the RFID tag and is storing energy that is being generated by the charge pump of the tag by sucking energy from the electromagnetic or magnetic field of a tag reader, and the other one is uncoupled from the power extraction circuitry of the RFID tag and is discharging and powering the computational element of the tag chip.

15 Claims, 1 Drawing Sheet

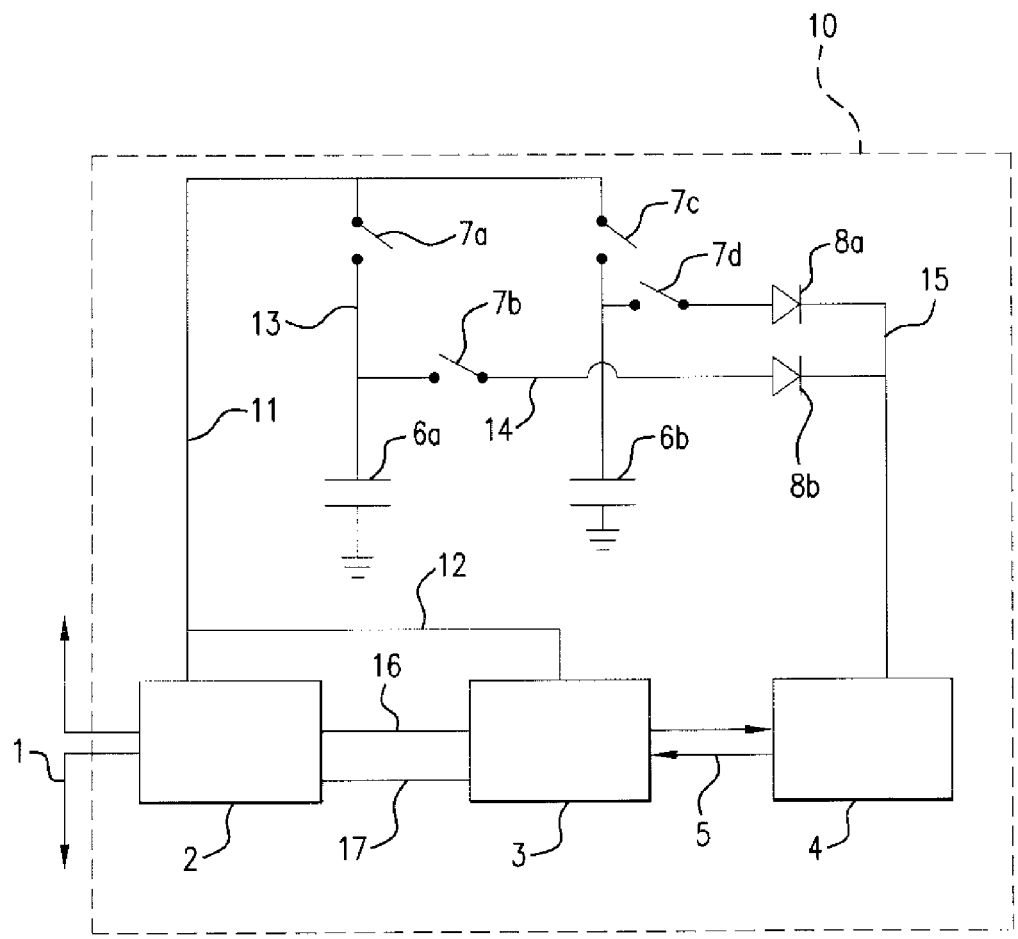

METHOD AND APPARATUS FOR PROTECTING RFID TAGS FROM POWER ANALYSIS

BACKGROUND OF INVENTION

1. Field of Invention

The present invention relates to novel techniques, methods, and apparatus for protecting RFID tags from power analysis or from cryptanalytic attacks based on power analysis such as SPA or DPA when they are communicating with a tag reader.

2. Prior Art

Once considered merely as an upgrade to the humble optical barcode, passive RFID tags have been recently making gains both in their capabilities and in their planned applications. The regulatory bodies behind the tag standards are aware of security and privacy issues and have been urging tag makers to make their tags as secure as possible. There are even indications that RFID tags will soon implement full-fledged cryptographic functionality. A secure tag can enhance the privacy of consumers purchasing RFID-equipped products and the security of retailers using RFID technology, who need to know that tags are not tampered with. This is especially the case when discussing RFID-enabled passports, which are currently planned for several countries. The threat model under which RFID tags are designed to be secure is based on an adversary who is able to listen to communications between tag and reader but does not have physical access to the tag. Security countermeasures such as cover coding and even secret key encryption have been planned and deployed to address this scenario.

An RFID system consists of a high-powered reader communicating with an inexpensive tag using a wireless medium. The reader generates a powerful electromagnetic field around itself and the tag responds to this field. In passive systems, placing a tag inside the reader's field also provides it with the power it needs to operate.

It was recently discovered by Oren and Shamir that it is possible to launch an attack on RFID tags which can be called a parasitic backscatter attack. Such an attack is basically a power analysis attack in that it measures the power consumed by a tag, but it is unique in that it does not require either tag or reader to be physically touched by the attacker. By making use of the fact that the tag is powered from the air, one is able to measure the tag's power consumption unintrusively and at a distance. The power analysis can be carried out even if both the tag and the attacker are passive and transmit no data, making the attack very hard to detect. The attack is effective on UHF tags and can also be adapted to HF tags, which typically use magnetic rather than electromagnetic coupling with the reader.

An operating UHF reader surrounds itself with a powerful electromagnetic field. Placing a tag in the reader's field causes a current to flow through the tag's dipole antenna. Since the dipole now has a variable electrical current flowing through it, it generates a Backscatter from Tag to Reader because the reader-tag channel and its equivalent circuit generate an electromagnetic field of its own. The strength of this field is a function of the current flowing through the dipole antenna, which is in turn a function of the power consumption of the tag.

It is worth noting that the tag intentionally modulates the backscatter radiation typically by means of a switched impedance connected in parallel to the tag circuit. This allows the tag to transmit data back to the reader through a mechanism called backscatter modulation. As has been recently determined by Oren and Shamir, the tag also unintentionally modulates the backscatter radiation in a measurable way via its internal computations. The tag's intentional modulation does not disturb an attacker's measurements of its unintentional modulation because the tag and reader operate in a half-duplex line regime, meaning that the tag does not transmit data while the reader is sending it commands.

Protocols define how tags and readers should communicate and what data a tag should store. One such protocol specifies a 96-bit ID to each tag, as well as an 8-bit kill password which can be concealed from unauthorized readers. Sending a tag a kill command with the appropriate kill password disables it permanently. However, this protocol is not without its problems. The protocol made it difficult to program and read a large number of tags simultaneously, and most notably it had a phantom read problem—tags are validated only by a 16-bit CRC value, so with probability $2^{-16}$ a reader receiving random noise will report seeing a tag even if none are present.

Another protocol has a better-designed air interface, as well as more strictly defining the contents and capabilities of tags. This protocol increases the amount of data which can be stored on the tag from 128 bits to 2048 bits, and replaces the 8-bit kill password with a pair of 32-bit passwords: the kill password and the access password.

Since the reader has a higher transmit strength than the tag, it makes sense to protect against adversaries who can detect the reader's signal but not the tag's backscatter. Tags use cover coding to add this protection. Under this scheme, the tag sends a pseudorandom sequence to the reader, and the reader XORs the kill password with this sequence. An adversary, who can intercept only the reader's powerful signal, and not the tag's weak response, cannot learn the actual data exchanged between the reader and the tag. To meet the tag's limited memory and power constraints, the tag only remembers 16 pseudorandom bits at a time, requiring two rounds to go through the whole 32 bit password. Although the cover coding slightly complicates a power analysis attack, it does not prevent it.

In U.S. Pat. No. 6,507,913, a method and apparatus to protect smart cards from power analysis is described. Whereas, the attack problem concerning smart cards is similar broadly with protecting RFIDs, the double buffering protection mechanism described there is much more suitable for RFID tags than for smart cards, for reasons which will be explained shortly.

SUMMARY OF THE INVENTION

The present invention presents a cheap and effective solution for protecting RFIDs, which is perhaps the most compatible with current RF front ends found on tags. According to the inventive concept, a separation is created of the power supply from the power consumption by use of a double-buffering power supply mechanism consisting of a pair of capacitors switched by power transistors. At any stage in time, one capacitor is charged by the reader's field while the other is being discharged by the circuit. With appropriate design, the present invention can almost eliminate the power consumption information. Moreover, this design involves changes only to the RF front-end of the tag, making it the quickest to roll out. To make this countermeasure more cost effective, large flat capacitors can be attached to the plastic carrier next to the printed antenna. Note that unlike the case of smart cards, power analysis of RFID tags is likely to be carried out remotely (e.g., without opening in the store the product enclosure in which the RFID tag is placed) and thus, one is less concerned about an attacker cutting off the capacitors to get around the countermeasure. Tags using this protective mechanism still have to take care that power consumption does not leak out through the intentional backscatter modulation mechanism, which has to come out of the circuit proper and connect to the antenna.

Another major difference is that smart cards do not try to economize their power consumption, and with newer more powerful chips with security coprocessors, the power consumption gets even higher. It is thus difficult to run them from the tiny amount of power stored in a small capacitor. In contradistinction, RFID's get their power from the electromagnetic field around them, so they use very little power in order to be operable from a reader which is several meters away. This makes the protection technique more suitable for RFID tags than for smart cards.

Accordingly the present invention concerns a novel apparatus and method employed for protecting an RFID tag from attack. The method and apparatus of the invention protects RFID tags against simple and differential power attacks. The invention is particularly useful regarding inventory control systems and secure documents, such as e-passports.

An RFID tag includes a chip that typically contains a power extraction circuit (charge pump) to draw energy from the environment, i.e. the electromagnetic or magnetic field generated by the tag reader to power the chip, a modulator/demodulator to communicate with the reader by measuring and modifying the field, and the logic and memory part which keeps data and executes instructions, i.e. the computational element. It is the last-mentioned element that is protected against power analysis by the invention.

An RFID tag, as mentioned, includes a connected antenna, and coacts with a remote or separate reader, in a manner that is well known in the art. The two capacitors noted above, that comprise part of the inventive apparatus, can either reside on the RFID chip itself, or can be attached to or printed on the plastic carrier of the tag along with the antenna.

During operation, one capacitor is being charged by the power extraction circuit noted above, while the other capacitor is used to power the computational element, i.e. the logic and memory part, and then their roles are switched. The switchover can be triggered by time or voltage or the data sent by the reader or any combination thereof, and the partially discharged capacitor can be further discharged to a set voltage before it is reconnected to the power extraction circuit in order to guarantee that no information about how much power it supplied to the logic and memory part will be leaked out.

Since smart cards do not normally use capacitors to power them, the introduction of the double buffering technology for smart cards described in U.S. Pat. No. 6,507,913 required a major and expensive redesign of the circuit. On the other hand, RFID's always have at least one capacitor to power them through the charge pump, and thus it is much easier to adapt them to use the double buffering technology. Many RFID's already have multiple capacitors, but they are used to get a higher voltage which is needed to operate the electronic circuitry (e.g., all the capacitors can be charged in parallel to a low voltage, and then reconnected in series to get a higher total voltage). One should be careful not to confuse this application of multiple capacitors with the novel double buffering concept of the present invention.

Accordingly, it is an object of the invention to provide a method of protecting an RFID tag including a power extraction circuit and a computational circuit comprising the steps of extracting power from an electromagnetic or magnetic field generated by a reader in whose proximity the tag is located, double-buffering the extracted power by at least two capacitors so that at any stage in time (except possibly during the changeover periods), at least one capacitor is being charged by the extracted power while at least one other capacitor is being discharged to power the computational circuit of the RFID tag. Still further, the method can include the step of switching the capacitors. The step of switching can be carried out using power transistors. Also, the step of switching can be repeatedly carried out, especially in a periodic way, and even, continuously.

It is a still further object of the invention to provide a method comprising the steps of: a) powering an RFID tag by a power extraction circuit that charges a capacitor connected in the RFID circuit, b) periodically disconnecting the capacitor from the power extraction circuit, and c) discharging the capacitor while it is disconnected from the power extraction circuit to power a computational element of the RFID tag. Step b) can be triggered by the voltage across some capacitor exceeding or dropping below a certain threshold. Also, step b) can be triggered by time or by the data sent by the reader, or by any combination thereof. Further, additional circuitry of the RFID tag can discharge the capacitor to a fixed voltage before reconnecting it to the power extraction circuit for charging in a repeat of step a).

Yet, it is still a further object of the invention to provide apparatus comprising: a) an RFID tag including an antenna, a power extraction circuit for generating power from an electromagnetic or magnetic field of a reader with which it is associated, and a computational circuit, b) at least two capacitors, each coupled between the power extraction circuit and the computational circuit, and c) switchover logic for alternately connecting the capacitors for at least one to discharge to power the computational circuit while at least one other is being charged by the power extraction circuit. The switchover logic can be such that the functions of the at least two capacitors are repeatedly reversed, and the RFID tag operates continuously. Also, the switchover logic can be such that the change of connection (switching of the capacitors) is triggered by the voltage across one of the capacitors exceeding or dropping below a certain threshold. Still further, the switchover logic can be such that the change of connection is triggered by a preselected event. Also, the switchover logic can be such that the change of connection is triggered by the voltage across at least one of the capacitors exceeding or dropping below a certain threshold at the beginning of a preselected event. In a preferred form of the invention, the switchover logic includes power transistors. A simple generalization of the present invention is to use three or more capacitors in such a way that at any time at least one of them is charging and at least one of the others is powering the computational element.

Other objects and advantages of the present invention will become evident from a detailed description of a preferred embodiment of the invention when taken in conjunction with the appended drawing.

BRIEF DESCRIPTION OF THE DRAWING

The sole FIGURE of the drawing shows schematically the present invention.

DETAILED DESCRIPTION OF THE PREFERRED EMBODIMENT OF THE INVENTION

Referring now to the drawing, the preferred embodiment will now be described in detail. Shown is an RFID tag 10 which contains a power extraction circuit 2 connected to an antenna 1 that communicates with a tag reader (not shown) which has its own antenna and circuitry as is standard and known in the art. The antenna 1 is also coupled to a modulation-demodulation circuit 3 by leads 16 and 17 going through circuit 2. The circuit 3 is coupled to a logic and memory circuit 4, which is the computational element of tag 10. Data and control signals 5 pass between the circuits 3 and 4. The set-up thus far is standard for an RFID tag.

The object of the preferred embodiment is to allow circuit 4 to operate continuously without being directly powered by the power extraction circuit 2 during all or part of its computational function. To this end, two capacitors 6a and 6b are connected to ground on one side and to contacts of switches 7a and 7c, which switches 7a and 7c are connected to power extraction circuit 2 via leads 11 and 13. Leads 14 and 15 connect leads 11 and 13 to logic and memory circuit 4. Interposed in these leads 14 and 15 are further switches 7c and 7d. All the switches 7a to 7d can be comprised of power transistors suitably controlled by switchover logic, as described hereinafter, and connected either to the extraction circuit 2 or via two diodes 8a and 8b interposed in the leads 14 and 15.

In the preferred embodiment of the new invention the connections of the two capacitors alternate in a periodic way. During odd periods the first capacitor, either 6a or 6b, is connected to power extraction circuit 2 and the second capacitor, either 6a or 6b, respectively, is connected to the logic and memory circuit 4, and during even periods the connections are reversed. The preferred sequence of actions of the power transistors 7a to 7d that are controlled by the switchover logic is: (i) the first capacitor is disconnected from circuit 2; (ii) the first capacitor is connected to the circuit 4; (iii) the second capacitor is disconnected from the circuit 4; and (iv) the second capacitor is connected to the circuit 2.

With this sequence of actions, the computational element 4 is always powered by at least one capacitor, but the power extraction circuit 2 is never connected directly to circuit 4. The capacitors 6a and 6b are connected via diodes 8a and 8b to prevent leakage from the charged capacitor to the discharged capacitor during the brief moments in which they are connected in parallel to the circuit 4.

To completely eliminate any information about the power consumed by the circuit 4, it is recommended to fully or partially discharge the capacitor that had just been disconnected from it to a fixed voltage before connecting the capacitor to circuit 2.

Although the present invention has been shown and described in terms of preferred embodiments, nevertheless changes and modifications will be evident to those skilled in the art from knowledge of the disclosure and teachings herein. Such changes and modifications which do not depart from the teachings, scope and spirit of the present invention are deemed to fall within the purview of the invention as claimed.

What is claimed is:

1. A method of protecting an RFID tag from power analysis or from cryptanalytic attacks based on power analysis, such as SPA and DPA, said RFID tag including a power extraction circuit and a computational circuit, comprising the steps of extracting power from an electromagnetic or magnetic field generated by a reader in whose proximity the tag is located, modifying the power extraction circuit of the RFID tag by providing at least two capacitors configured relative to the power extraction circuit to double-buffer the extracted power during normal functioning of the RFID tag by so that at any stage in time, except possibly during changeover periods, at least one capacitor is being charged by the extracted power while at least one other capacitor is uncoupled from the power extraction circuit and is being discharged to power the computational circuit of the RFID tag, and continuously switching the capacitors so that the discharged capacitor is connected to be charged by the extracted power and the charged one is uncoupled from the power extraction circuit.

2. The method of claim 1 in which the step of switching is carried out using power transistors.

3. The method of claim 1 in which the step of switching is repeatedly carried out, in a periodic way.

4. The method of claim 3 in which the plurality of capacitors are switched continuously by one of (a) whenever the voltage on one of the capacitors exceeds or goes below a set value, (b) whenever the reader sends some data, (c) based on time and (d) on any combination of (a), (b) and (c).

5. A method comprising the steps of: a) powering an RFID tag by a power extraction circuit that charges a capacitor connected in the RFID circuit, b) periodically and repeatedly disconnecting the charged capacitor from the circuit during normal functioning of the RFID tag, and c) using the charge on the capacitor while it is disconnected from the power extraction circuit to power a computational function of the RFID tag, and reconnecting the discharged capacitor to the power extraction circuit to be recharged; and modifying the power extraction circuit of the RFID tag by providing at least two capacitors configured relative to the power extraction circuit to double-buffer the extracted power during normal functioning of the RFID tag by so that at any stage in time, except possibly during changeover periods, at least one capacitor is being charged by the extracted power while at least one other capacitor is uncoupled from the power extraction circuit and is being discharged to power the computational circuit of the RFID tag, and continuously switching the capacitors so that the discharged capacitor is connected to be charged by the extracted power and the charged one is uncoupled from the power extraction circuit.

6. The method of claim 5, in which step b) is triggered by the voltage across another capacitor connected in the RFID circuit exceeding or dropping below a certain threshold.

7. The method of claim 5, in which step b) is triggered by time.

8. The method of claim 5, in which step b) is triggered by the voltage across another capacitor connected in the RFID circuit exceeding or dropping below a certain threshold at the beginning of a preselected time increment.

9. The method of claim 5, wherein additional circuitry of the RFID tag discharges the capacitor to a fixed voltage before reconnecting it to the power extraction circuit for charging in a repeat of step a).

10. Apparatus comprising: a) an RFID tag including a power extraction circuit for generating power from an electromagnetic or magnetic field of a reader with which it is associated, and a computational circuit to be powered by extracted power, b) at least two capacitors each coupled between the power extraction circuit and the computational circuit, and c) switchover logic operative during normal functioning of the RFID tag for alternately and repeatedly connecting at least one discharged capacitor to be charged by the power extraction circuit while at least one other charged capacitor is uncoupled from the power extraction circuit and is being discharge to power the computational circuit; and modifying the power extraction circuit of the RFID tag by providing at least two capacitors configured relative to the power extraction circuit to double-buffer the extracted power during normal functioning of the RFID tag by so that at any stage in time, except possibly during changeover periods, at least one capacitor is being charged by the extracted power while at least one other capacitor is uncoupled from the power extraction circuit and is being discharged to power the computational circuit of the RFID tag, and continuously switching the capacitors so that the discharged capacitor is connected to be charged by the extracted power and the charged one is uncoupled from the power extraction circuit.

11. Apparatus according to claim 10 wherein the switchover logic is such that the capacitors are repeatedly reversed.

12. Apparatus according to claim 10 wherein the switchover logic is such that the capacitors are switched continuously and repeatedly by one of (i) the voltage on one of the capacitors exceeds or goes below a set value, (ii) whenever the reader sends some data, (iii) based on time and on any combination of (i), (ii) and (iii).

13. Apparatus according to claim 10 wherein the switchover logic is such that the switching of the capacitors is triggered by a preselected event.

14. Apparatus according to claim 10 wherein the switchover logic is such that the switching of the capacitors is triggered by the voltage across at least one capacitor exceeding or dropping below a certain threshold at the beginning of a preselected event.

15. Apparatus according to claim 10 wherein the switchover logic includes power transistors.

* * * * *